(12) United States Patent
Clark

(10) Patent No.: US 6,843,483 B2
(45) Date of Patent: Jan. 18, 2005

(54) SEAL RING FOR ORIFICE PLATE

(76) Inventor: Derold Gary Clark, 48 Jarvis Bay Dr., Sylvan Lake, Alberta (CA), T4S 1R9

( * ) Notice: Subject to any disclaimer, the term of this patent is extended or adjusted under 35 U.S.C. 154(b) by 0 days.

(21) Appl. No.: 10/390,450

(22) Filed: Mar. 17, 2003

(65) Prior Publication Data
US 2004/0090018 A1 May 13, 2004

(30) Foreign Application Priority Data
Nov. 7, 2002 (CA) ............................................. 2411327

(51) Int. Cl.⁷ ............................. F16L 5/02; F16L 17/00; F16J 15/02; F15D 1/02
(52) U.S. Cl. ....................... 277/606; 277/609; 277/616; 277/626; 277/630; 277/637; 138/45; 138/94.3; 285/363
(58) Field of Search ................................ 277/602–606, 277/609, 611–612, 614–616, 619, 621, 626–628, 630, 637–639, 644, 624; 285/363, 368; 138/44–45, 94, 94.3

(56) References Cited

U.S. PATENT DOCUMENTS

| | | | | |
|---|---|---|---|---|
| 4,218,080 A | * | 8/1980 | Kendrick | 285/347 |
| 4,593,915 A | * | 6/1986 | Seger et al. | 277/643 |
| 4,633,911 A | * | 1/1987 | Lohn | 138/44 |
| 4,712,585 A | * | 12/1987 | Evans | 138/44 |
| 5,085,250 A | | 2/1992 | Kendrick | 138/44 |
| 5,186,474 A | | 2/1993 | Jacobs | 277/166 |
| 5,655,571 A | * | 8/1997 | Gawlik | 138/44 |
| 6,234,545 B1 | * | 5/2001 | Babuder et al. | 285/364 |
| 6,290,237 B1 | * | 9/2001 | Graupner | 277/603 |
| 6,402,159 B1 | * | 6/2002 | Kohn | 277/608 |

* cited by examiner

*Primary Examiner*—Alison Pickard
*Assistant Examiner*—Vishal Patel
(74) *Attorney, Agent, or Firm*—Davis & Bujold, P.L.L.C.

(57) ABSTRACT

A seal ring for an orifice plate includes a metal annular body having an outer peripheral edge and an inner peripheral edge. A first sealing element retainer is integrally formed with and extends from a first side of the body. A second sealing element retainer is integrally formed with and extends from a second side of the body. An annular first sealing element engages the first sealing element retainer on the first side of the body. An annular second sealing element engages the second sealing element retainer on the second side of the body. The first sealing element and the second sealing element leave the outer peripheral edge of the body exposed to facilitate metal on metal contact between a carrier of an orifice fitting and the outer peripheral edge. The first sealing element and the second sealing element extend past the inner peripheral edge to form an orifice plate receiving groove.

4 Claims, 2 Drawing Sheets

SEAL RING FOR ORIFICE PLATE

FIELD OF THE INVENTION

The present invention relates to a seal ring for an orifice plate.

BACKGROUND OF THE INVENTION

Flow rates are measured with a flat orifice plate which is installed in an orifice fitting. The orifice plate is held in position and sealed along its peripheral edge, to prevent fluids bypassing the orifice, by means of a seal ring. In order to ensure accuracy of flow rate measurement, the orifice must be concentrically disposed in the flow path. The American Gas Association (AGA) sets standards for orifice concentricity.

One of the focal points in improving concentricity, has been to develop improved seal rings for the orifice plates, that will maintain metal to metal contact. In the absence of metal on metal contact, elastomeric deformation under operating conditions will result in unacceptable movement. Examples of improved seal rings for orifice plates are illustrated and described in U.S. Pat. No. 5,085,250 (Kendrick 1992) and U.S. Pat. No. 5,186,474 (Jacobs 1993). The Kendrick reference teaches the use of grooves on an elastomeric seal ring and engagement ears on the carrier which moves the orifice plate in and out of the orifice fitting, to ensure metal on metal contact. The Jacobs reference teaches the use of circumferentially spaced metal locking pins to ensure metal on metal contact with the carrier.

SUMMARY OF THE INVENTION

The present invention relates to an alternative form of improved seal ring for an orifice plate.

According to the present invention there is provided a seal ring for an orifice plate which includes a metal annular body having an outer peripheral edge and an inner peripheral edge. A first sealing element retainer is integrally formed with and extends from a first side of the body. A second sealing element retainer is integrally formed with and extends from a second side of the body. An annular first sealing element engages the first sealing element retainer on the first side of the body. An annular second sealing element engages the second sealing element retainer on the second side of the body. The first sealing element and the second sealing element leave the outer peripheral edge of the body exposed to facilitate metal on metal contact between a carrier of an orifice fitting and the outer peripheral edge. The first sealing element and the second sealing element extend past the inner peripheral edge to form an orifice plate receiving groove.

The seal ring, as described above, utilizes a three component system. The first sealing element and the second sealing element seal the first side and the second side of the metal body, while extending past the inner peripheral edge to form the orifice plate receiving groove in which the orifice plate is received. With the first sealing element and the second sealing element in position, the outer peripheral edge of the metal body remains exposed for metal on metal contact with the carrier of the orifice fitting.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
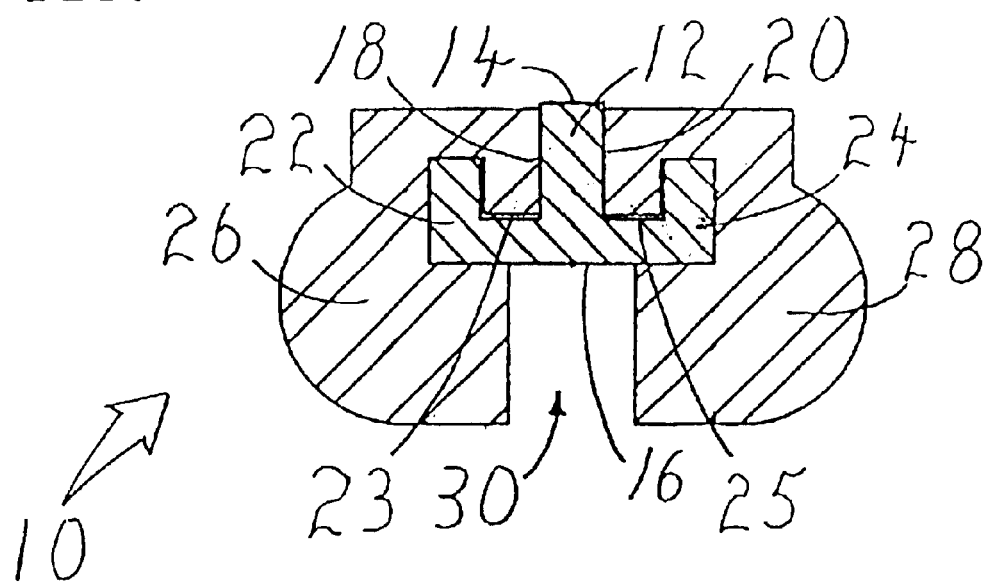
FIG. 1 is a detailed cross-section view of a seal ring for an orifice plate constructed in accordance with the teachings of the present invention.

The preferred embodiment, a seal ring for an orifice plate generally identified by reference numeral 10, will now be described with reference to FIGS. 1 through 4.

Figure 2:
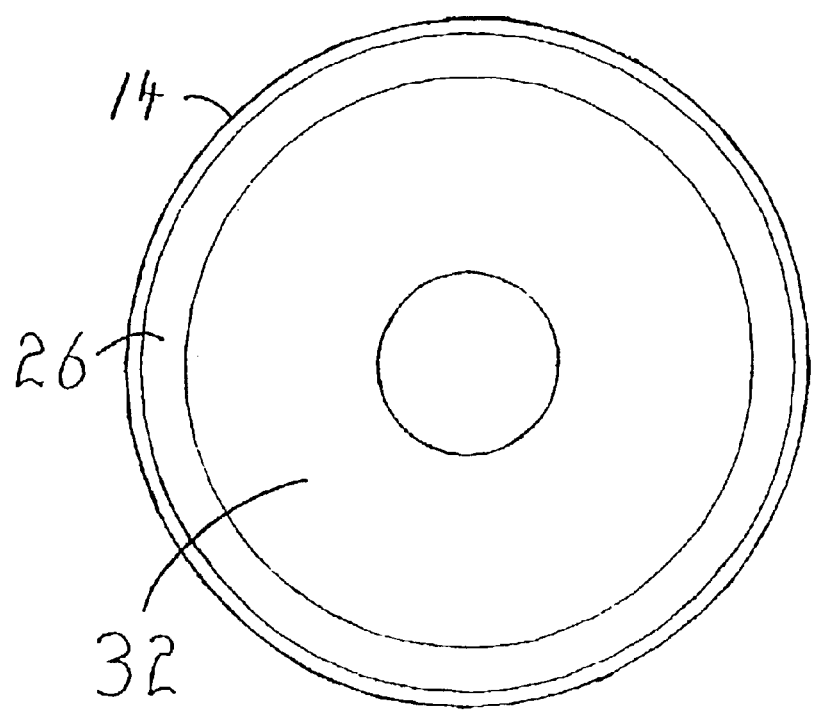
FIG. 2 is a front elevation view of the seal ring illustrated in FIG. 1 with orifice plate in position.
Figure 3:
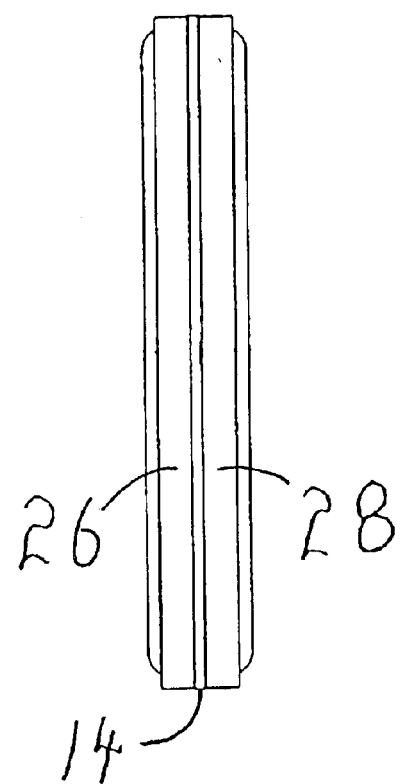
FIG. 3 is an end elevation view of the seal ring illustrated in FIG. 1 with orifice plate in position.
Figure 4:
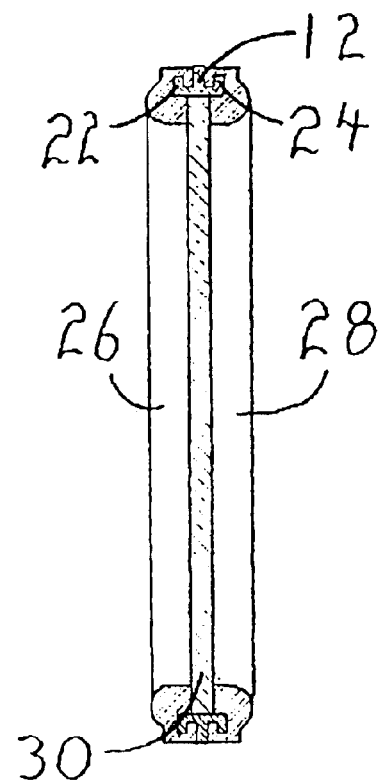
FIG. 4 is an end elevation view, in section, of the seal ring illustrated in FIG. 2 with orifice plate in position.

Structure and Relationship of Parts:

Referring to FIG. 1, seal ring 10 has a metal annular body 12 with an outer peripheral edge 14, an inner peripheral edge 16, a first side 18 and a second side 20. A first sealing element retainer 22 extends outwardly from first side 18 creating a first retention channel 23. A second sealing element retainer 24 extends outwardly from second side 20 creating a second retention channel 25. First sealing element retainer 22 and second sealing element retainer 24 are integrally formed to metal annular body 12. Metal annular body 12 with first sealing element retainer 22 and second sealing element retainer 24 creates an inverted "T" shaped cross-sectional profile. An annular first sealing element 26 engages first sealing element retainer 22 at first side 18 of metal annular body 12. An annular second sealing element 28 engages second sealing element retainer 24 at second side 20 of metal annular body 12. By extending past inner peripheral edge 16, annular first sealing element 26 and annular second sealing element 28 form an orifice plate receiving groove 30. Further, the orientation of annular first sealing element 26 and annular second sealing element 28 allow metal to metal contact at outer peripheral edge 14. Referring to FIGS. 2 through 4, orifice plate 32 is positioned within plate receiving groove 30.

Operation:

The use and operation of a seal ring for orifice plate generally referred to as numeral 10 will now be described with reference to FIGS. 1 through 4. Referring to FIGS. 2 and 4, in order to ensure the concentricity of orifice plate 32, metal annular body 12 with first sealing element retainer 22 and second sealing element retainer 24 is fitted circumferentially about orifice plate 12. Referring to FIGS. 1 and 3, annular first sealing element 26 is fittingly engaged to first sealing element retainer 22 at first side 18 of metal annular body 12. Annular second sealing element 28 is fittingly engaged to second sealing element retainer 24 at second side 20 of metal annular body 12. In the preferred embodiment, annular first sealing element 26 and annular second sealing element 28 are of an elastomeric nature that allows a flexible installation. Once orifice plate 32 with seal ring 10 is positioned within an orifice fitting, metal on metal contact at outer peripheral edge 14 maintains the concentricity of orifice plate 32 within accepted tolerances.

It will be understood by persons familiar with orifice fittings that, in addition to maintaining a fluid seal against orifice plate 32, first sealing element 26 and second sealing element 28 fit into a seal gap in the orifice fitting and maintain a fluid seal against the metal surfaces of the orifice fitting which define this seal gap.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A seal ring for an orifice plate, comprising:
   a metal annular body having an inverted "T" shaped cross-sectional profile, the body having an outer peripheral edge, an inner peripheral edge, a first sealing element retainer integrally formed with and extending from a first side of the body, and second sealing element retainer integrally formed with and extending from a second side of the body;
   an annular first sealing element engaging the first sealing element retainer on the first side of the body;
   an annular second sealing element engaging the second sealing element retainer on the second side of the body;
   the first sealing element and the second sealing element leaving the outer peripheral edge of the body exposed to facilitate metal on metal contact between a carrier of an orifice fitting and the outer peripheral edge; and
   the first sealing element and the second sealing element extending past the inner peripheral edge to form an orifice plate receiving groove.

2. The seal ring for an orifice plate as defined in claim 1, wherein the first sealing element and the second sealing element are made from elastomeric material.

3. The seal ring for an orifice plate as defined in claim 1, wherein the first sealing element retainer and the second sealing element retainer define retention channels.

4. A seal ring for an orifice plate, comprising:
   a metal annular body having an inverted "T" shaped cross-sectional profile, the body having an outer peripheral edge, an inner peripheral edge, a first sealing element retainer integrally formed with and extending from a first side of the body to form a first retention channel, and second sealing element retainer integrally formed with and extending from a second side of the body to form a second retention channel;
   an elastomeric annular first sealing element engaging the first sealing element retainer on the first side of the body;
   an elastomeric annular second sealing element engaging the second sealing element retainer on the second side of the body;
   the first sealing element and the second sealing element leaving the outer peripheral edge of the body exposed to facilitate metal on metal contact between a carrier of an orifice fitting and the outer peripheral edge; and
   the first sealing element and the second sealing element extending past the inner peripheral edge to form an orifice plate receiving groove.

* * * * *